Nov. 10, 1942.  W. G. DAVIS  2,301,619

DOCTORING MECHANISM

Filed April 16, 1941  2 Sheets-Sheet 1

Inventor

Willis G. Davis,

By Ruess & Geier

Attorneys

Nov. 10, 1942.   W. G. DAVIS   2,301,619
DOCTORING MECHANISM
Filed April 16, 1941   2 Sheets-Sheet 2

Inventor
Willis G. Davis,
By Ruess & Geier
Attorneys

Patented Nov. 10, 1942

2,301,619

UNITED STATES PATENT OFFICE 2,301,619

DOCTORING MECHANISM

Willis G. Davis, Pompton Plains, N. J., assignor to Ascote, Inc.

Application April 16, 1941, Serial No. 388,906

12 Claims. (Cl. 91—29)

This invention relates to a doctoring mechanism for effecting application of a coating to material, and more particularly for coating siding used in connection with the walls of buildings or other structures, with asphalt, as set forth in my application for patent filed April 16, 1941, Serial No. 388,909.

The primary object of the invention is to provide a mechanism of this type which effects a smooth, even or uniform application of the coating to a surface of the material.

Another object of the invention is to provide for regulation of the thickness of the coating as conditions may require.

Still further the invention aims to provide for the coating of material which is of tapering cross-section.

A still further object of the invention is to provide a novel form of trough wherein the material to be coated forms the bottom of the trough.

Another objection of the invention is to provide for easy and quick manipulation of the parts in regulating the depth of the coating and in adjustment to provide for material of non-uniform or varying cross-section.

The invention also aims to provide a mechanism of the type set forth of simple construction; which involves a minimum of parts compactly related.

Further and other objects will be later set forth and of themselves manifested in the course of the following description.

In proceeding in accordance with the present invention a suitable base structure 1, is employed having top members 2, on which are secured a series of longitudinal extending inverted T-shaped supports 3, the bases of which are affixed to the top members 2 in any suitable manner.

Figure 2:
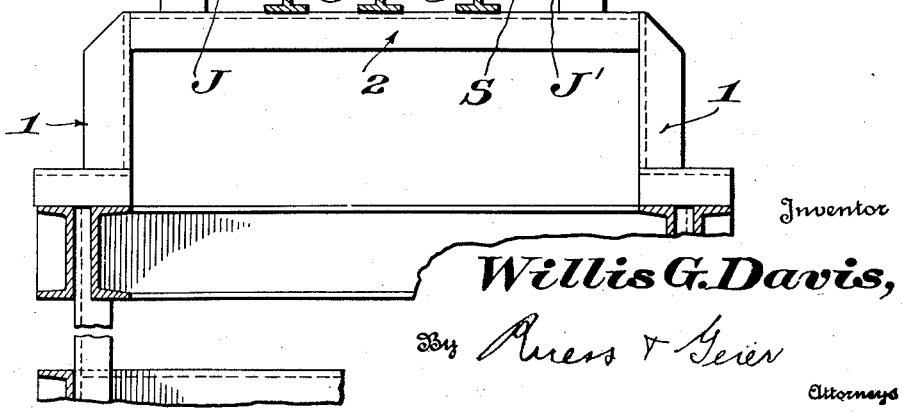
Fig. 2 is a front elevation; parts being broken away and shown in section.

The material to be coated here shown as siding S, is superimposed upon the upper side edges of the legs of the rails or supports 3, as shown in Fig. 2, and is supported thereby during movement through the trough, the bottom of which is constituted by the material.

The sides of the trough 4 may be formed of channel iron as depicted in Fig. 2, and are spaced a distance equal to the width of the siding or other material, the latter having its side edges cut away to form lap joints J and J', for use in connection with building or other walls, and in the instance of the lap joint J' it will be observed that the cut-out or mortise engages the bottom as well as the inner face of the adjacent side 4.

Pairs of vertical guides 5 and 6 are connected to sides 4 of the trough at the front of the latter and receive therebetween slides 7 and 8, to which latter are connected screws 9 and 10, which are threaded through nuts 11 and 12, or the like, secured to the top of the frame.

A shaft 13 has a doctoring blade in the form of a cylinder or roll 14 eccentrically and rigidly secured to the ends of the roll, the shaft being connected to the slides 7 and 8, commonly known as takeup units 15 and 16, which latter are of conventional type, i. e., ball bearing units wherein sufficient play is provided between the balls and their races, whereby upon adjustment of the screws 9 and 10, the shaft 13, and therewith the roll 14, can be tilted relative to their longitudinal axes to provide for siding which is of tapering cross-section. Since the asphalt is maintained heated, the use of ball bearings is of advantage, otherwise the heat would dry the lubricant and cause an ordinary sleeve bearing and the shaft to become locked, whereas a ball bearing will function although dry.

For the purpose of varying the relation of the roll 14 to the material being treated, an arm 17 is rigidly connected to the shaft 13, and carries a slidable spring-pressed latch 18 which latter is engaged in a selected one of a series of openings 19 formed in an indexing disk 20 that is rigidly secured to the guides 5 in any suitable manner.

It will thus be seen that due to the eccentric mounting of the roll 14 on the shaft 13 and upon release of the latch 18 and manipulation of the handle 17, thereby to turn the roll 14, the distance between the upper surface of the siding and the lowermost arc of the roll can be varied as desired in accordance with the thickness or depth of the coating which is to be applied to the siding and also in accordance with the thickness of the siding itself.

Figure 4:
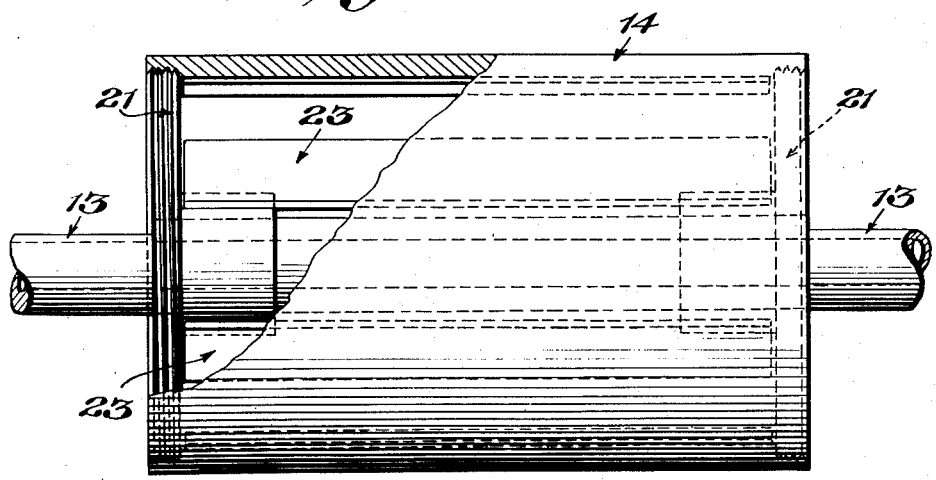
Fig. 4 is a like view of the spreading or doctoring blade roll, parts being broken away and shown in section.

As shown in Fig. 4, the roll 14 is of hollow formation and has its ends formed of closure disks 21 threaded into engagement therewith or otherwise secured, the shaft being rigidly secured to the disks in any suitable manner. The shaft 13 has heat from any desired source, such as an electrical one supplied to the interior thereof by supply wires 22 as shown in Fig. 2.

Strip heaters 23 are preferably mounted within and are carried by, the roll or cylinder so as to more effectively heat and retain the roll at the desired temperature. Obviously hot air or water could be employed in view of heat from an electrical source.

Figure 3:
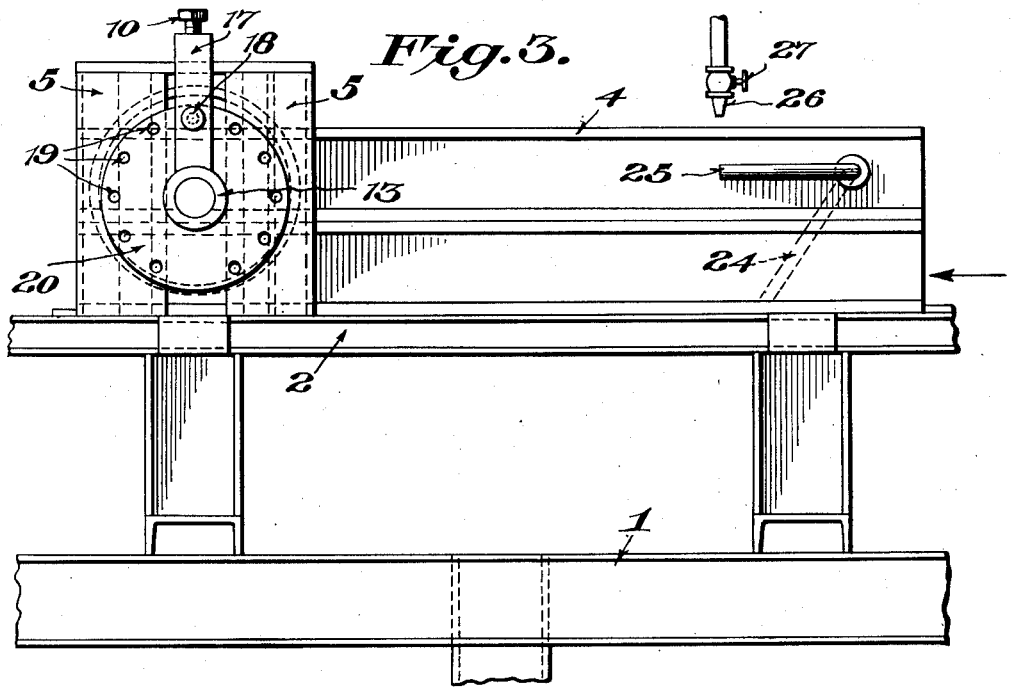
Fig. 3 is a side elevation.

It will be seen that the roll 14 substantially occupies the space between the sides 4 and forms the front end of the trough, while the opposite end of the trough is formed by a gravity responsive reverse flow valve or gate 24, which is journaled at one side thereof in the sides 4 of the trough and which is provided with a crank handle 25 by means of which the gate can be raised or lowered. The gate or valve 24 likewise occupies substantially the space between the sides 4 and during coating occupies the dotted line position shown in Fig. 3.

The coating is fed to the trough, which in the instance of siding is asphalt, by means, such as a nozzle 26, having a handle control valve 27, the nozzle having connection with any suitable source of coating supply.

In operation, by manipulation of the handle 17 and the latch 18 thereof, the roll may be set as desired to accommodate various thicknesses of material and or the depth of the coating, and by manipulation of the screws 9 or 10 the doctoring blade or roll 14 may be axially tilted as above set forth.

Figure 1:
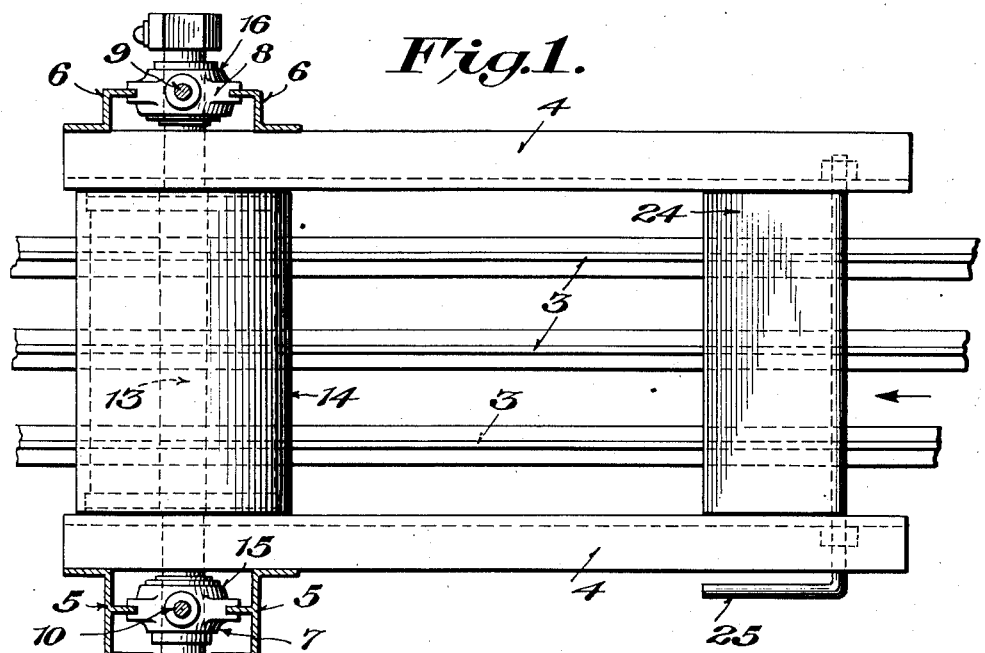
Fig. 1 is a section on line 1—1 of Fig. 2.

It will be seen that the coating is supplied to the trough adjacent to the rear side of the valve 24. The material is fed into the trough in the direction of the arrow shown in Figs. 1 and 3, thereby lifting the gate valve 24 whereupon the latter gravitates to a position in which its lower edge engages the upper surface of the material during its movement into the trough. The operation may be a continuous one and the material thus expeditiously and effectively coated with a predetermined layer of asphalt or any other coating. Moreover the coating is spread or smothered by the doctoring blade and due to the presence of the heat applied to the coating by the blade, the uniformity and evenness of the coating is materially enhanced, or assured.

The gate 24 acts not only to prevent the asphalt from coming in contact with the rolls (not shown) that feed the material into the apparatus, but also acts to prevent the pool of asphalt, which is kept moving toward the doctor blade by the movement of the material, and upon stoppage of feed of the boards, from movement out of the trough.

It is expressly understood that the invention is susceptible of use with coating materials other than asphalt and thus not limited thereto.

The invention also is subject to such changes, alterations, or modifications, as may fall within the spirit thereof as announced by the following claims.

What is claimed is:

1. A mechanism of the type set forth, including a frame having a trough for receiving coating, composed of spaced sides formed to engage the side edges of the material to be coated, means to support the material so that the latter forms the bottom of the trough, a movable gate engageable with the material and extending substantially across the space between the sides and forming one end of the trough to prevent egress of the coating from the trough, and a doctoring member spaced forwardly of the gate and also extending substantially across the space between the sides to form the other end of the trough.

2. A mechanism in accordance with claim 1, wherein the gate is gravity responsive, whereby upon movement of the material thereagainst the gate will be lifted to admit the material into the trough and will then move downwardly and seat on the upper face of the material to prevent the egress of the coating from the trough.

3. A mechanism in accordance with claim 1, wherein the doctoring member consists of an eccentrically mounted rotary member, and wherein there are means to hold the rotary member in selected positions whereby to vary the thickness of the coating and to provide for materials of different thickness.

4. A mechanism in accordance with claim 1, wherein the doctoring member has means associated therewith for heating same.

5. A mechanism in accordance with claim 1, wherein there is means for axially tilting the doctoring member.

6. A mechanism in accordance with claim 1, wherein there is means for axially tilting the doctoring member from either end thereof.

7. A mechanism in accordance with claim 1, wherein the doctoring member consists of an eccentrically mounted roll having a handle provided with a latch, and wherein there is an indexing member fixed to the frame and which has a series of circular openings to receive the latch.

8. A mechanism of the type set forth including a trough for receiving coating, doctoring means in the trough, means to support the material during coating thereof, and a gravity responsive gate for preventing egress of the coating from the trough and spaced from the doctoring means whereby upon movement of the material against the gate the latter will be lifted to admit the material and will then move downwardly and seat on the upper face of the material to prevent the egress of the coating from the trough, the doctoring means and gate forming the ends of the trough.

9. A mechanism of the type set forth including a trough for receiving coating having spaced sides and an open bottom, doctoring means between the sides, closure means between the sides for preventing egress of the coating from the trough spaced from the doctoring means, means to mount the closure means whereby upon being engaged by material to be coated same will be displaced to permit entry of the material into the trough and to then seat on the material and means to support the material so that the latter forms the bottom of the trough, the ends of the trough being formed respectively by the doctoring and closure means.

10. A mechanism in accordance with claim 9, wherein the closure means is gravity responsive and seats on the material upon inserting the latter in the trough, thereby to prevent egress of the coating from the trough.

11. A mechanism of the type set forth including a trough to receive coating and the material to be treated, means to uniformly smooth the coating including an eccentrically mounted cylinder, and means to adjust the cylinder by rotation thereof to vary the depth of the coating and to provide for material of varying thickness.

12. A mechanism in accordance with claim 11, wherein the cylinder is axially tiltable.

WILLIS G. DAVIS.